United States Patent [19]
Nagaoka

[11] Patent Number: 5,820,988
[45] Date of Patent: Oct. 13, 1998

[54] USE OF A CROSSLINKED POLYURETHANE ADHESIVE ON A RETROREFLECTIVE SHEETING

[75] Inventor: Yoshiyuki Nagaoka, Yamagata, Japan

[73] Assignee: Minnesota Mining and Manufacturing Company, St. Paul, Minn.

[21] Appl. No.: 774,482

[22] Filed: Dec. 30, 1996

[30] Foreign Application Priority Data

Feb. 2, 1996 [JP] Japan .................................. 8-017491

[51] Int. Cl.⁶ .............................. B32B 27/40; G09F 13/16
[52] U.S. Cl. ..................... 428/423.1; 359/536; 359/538; 359/540; 359/541; 428/423.3; 428/423.7; 428/424.4
[58] Field of Search .............................. 428/423.1, 423.3, 428/423.7, 424.4, 188; 359/536, 538, 540, 541

[56] References Cited

U.S. PATENT DOCUMENTS

| | | | |
|---|---|---|---|
| 4,025,159 | 5/1977 | McGrath | 359/514 |
| 4,377,988 | 3/1983 | Tung et al. | 119/654 |
| 4,533,592 | 8/1985 | Bingham | 428/213 |
| 4,653,854 | 3/1987 | Miyata | 359/514 |
| 4,763,985 | 8/1988 | Bingham | 359/518 |
| 5,066,098 | 11/1991 | Kult et al. | 359/540 |
| 5,069,964 | 12/1991 | Tolliver et al. | 428/325 |
| 5,450,235 | 9/1995 | Smith et al. | 359/529 |

FOREIGN PATENT DOCUMENTS

| | | | |
|---|---|---|---|
| 2123538 | 11/1994 | Canada | C08L 09/02 |
| 2-93684 | 4/1990 | Japan | G09F 13/16 |
| 2-93685 | 4/1990 | Japan | G09F 13/16 |
| 4-161472 | 6/1992 | Japan | C09J 5/02 |
| 4-293986 | 10/1992 | Japan | C09J 175/04 |
| 6-316689 | 11/1994 | Japan | C09J 175/04 |
| 7-157742 | 6/1995 | Japan | C09J 175/04 |
| 5-320601 | 12/1995 | Japan | C09J 111/02 |

OTHER PUBLICATIONS

Patent Abstracts of Japan, JP 57–109877A, vol. 006, No. 202, 13 Oct. 1982.

Patent Abstracts of Japan, JP 5–271376A, vol. 018, No. 046, 25 Jan. 1994.

*Primary Examiner*—D. S. Nakarani
*Attorney, Agent, or Firm*—Karl G. Hanson; David R. Cleveland

[57] ABSTRACT

A retroreflective sheeting have a multitude of retroreflective elements that include a layer of optical elements and a reflective element(s) that is positioned functionally behind the optical elements. The retroreflective elements are supported by a polymeric layer, and an adhesive layer positioned below the support layer. The adhesive layer contains a polyurethane crosslinked by at least an isocyanate compound. The polyurethane is polymerized from a component containing a polyol having at least one alkyl side chain in a molecule, and the adhesive has (i) a storage modulus of about $2\times10^7$ to $8\times10^7$ dyne per square centimeter when measured in a tensile mode at a frequency of 35 Hz and 25° C., and (ii) a softening point of about 80° C. to less than 200° C.

6 Claims, 1 Drawing Sheet

USE OF A CROSSLINKED POLYURETHANE ADHESIVE ON A RETROREFLECTIVE SHEETING

TECHNICAL FIELD

The present invention relates to a retroreflective sheeting that uses a crosslinked polyurethane to bond the sheeting to a substrate, particularly a plasticized plastic substrate such as a traffic cone.

BACKGROUND

Conventional retroreflective sheetings:

An adhesive layer that is carried on a conventional retroreflective sheeting such as an enclosed lens retroreflective sheeting, an encapsulated lens type retroreflective sheeting, and an exposed lens retroreflective sheeting and that is used to bond the retroreflective sheeting to an adherent typically contains:

(i) an acrylic tackifier that has suitable tack but low resistance to a plasticizer (a pressure sensitive adhesive), or (ii) a polyurethane adhesive that has high resistance to the plasticizer but substantially no tack at room temperature because it is a heat activation type adhesive (mainly a heat sensitive adhesive).

For example, U.S. Pat. No. 5,069,964 (corresponding to JP-A-3-9837) and JP-A-5-131589 disclose an adhesive layer containing an acrylic tackifier, and U.S. Pat. No. 4,533,592 (corresponding to JP-A-61-41101) and U.S. Pat. No. 4,763,985 (corresponding to JP-A-63-38902) disclose a polyurethane adhesive which is used as a heat sensitive adhesive.

When a retroreflective sheeting carrying the acrylic tackifier, however, is bonded to an adherent containing a large amount of a plasticizer, the plasticizer migrates in the retroreflective sheeting so that the reflection luminance of the retroreflective sheeting is often decreased.

In contrast, it is known that, when polyurethane resin is used as an adhesive layer, migration of the plasticizer in the retroreflective sheeting is frequently prevented. The conventional polyurethane adhesive, however, has substantially no tack at room temperature because it is a heat activation type adhesive. Therefore, it cannot provide a good handling property in bonding the sheet to the adherent (for example, bonding to the adherent by simple pressing without heat activation) as in the case of the acrylic tackifier.

Conventional polyurethane adhesive:

As adhesives comprising a polyurethane and an isocyanate crosslinking agent (which may be called as a hardener) in combination, the following adhesives are known:

1) JP-A-7-157742

An aqueous adhesive composition comprising (a) an anionic ionomer type urethane resin emulsion (e.g. polyesterpolyol-aromatic diisocyanate copolymer emulsion), (b) an ethylene-vinyl acetate resin emulsion containing PVA as a protective colloid, (c) a tackifying agent having a softening point of 60° C. or higher, preferably a rosin-modified terpene-phenyl resin, (d) a carboxylated styrene-butadiene rubber latex having a glass transition temperature of 0° C. or lower, and (e) a water-dispersible aliphatic polyisocyanate compound.

2) JP-A-6-345957

A mixture of (a) a dispersion of a nitrile rubber comprising 80 to 50 wt. % of butadiene (or isoprene), 20 to 50 wt. % of (meth)acrylonitrile, and 0 to 10 wt. % of styrene, a monoethylenically a,b-unsaturated carboxylic acid, etc. and having a solid content of 5 to 70 wt. % and a Shore A hardness of solid component of 10 to 70, (b) a dispersion of polyurethane having a softening point of 40° to 120° C. and a solid content of 50 to 70 wt. %, and (c) a polyisocyanate compound in an amount of 0.1 to 20 wt. parts per 100 wt. parts of the total of the (a) and (b) dispersions.

3) JP-A-5-320601

An aqueous primer composition comprising (a) 5 to 40 wt. parts of a chloroprene rubber latex, (b) 5 to 40 wt. parts of an olefin resin emulsion, 5 to 40 wt. parts of a polyurethane latex which is obtained by self-emulsifying a urethane rubber having a softening point of 35° to 130° C., and 5 to 40 wt. parts of a tackifying agent.

4) JP-A-4-293986

A two-pack aqueous urethane adhesive in which a first component prepared by emulsifying a polyurethane obtained by reacting (a) a polyester comprising an alkylene group having 8 or more carbon atoms or polybutadiene glycol, (b) a hydrophilicity-imparting material having at least one hydrophilic group and at least two functional groups reactive with an isocyanate group, (c) a polyisocyanate compound and (d) a polyol, and a second component prepared by emulsifying a tackifying agent having a softening point of 80° C. or higher are mixed, and then a polyisocyanate is added to the mixture to cure it.

5) JP-A-4-161472

A two-pack moisture-curable primer composition comprising (a) a solution of an acrylate ester copolymer having a secondary transition temperature of −20° C. or lower and a free carboxylic acid group, and (b) a solution of a urethane prepolymer modified with a chlorinated rubber-modified urethane prepolymer (a solution comprising a chlorinated rubber and polyisocyanate), which is excellent in plasticizer resistance, chemical resistance, heat resistance, and so on.

The adhesives noted above as 1) to 5) cannot be used as "pressure-sensitive adhesives" after suppressing their flowability to an extent that they can be used as an adhesive layer by a crosslinking or curing reaction with the isocyanate compound.

JP-A-6-316689 discloses a moisture-curable reactive hot melt adhesive containing a polyurethane prepolymer having an isocyanate terminal. When this adhesive is melted and cooled to solidify, there is a relatively long time in which it does not lose tack, and the isocyanate-terminated prepolymer is cured by water or moisture in an air, whereby its adhesion force is increased. This polyurethane prepolymer is obtained by polymerizing a component mixture of (a) a polyesterpolyol having a melting point of 40° to 65° C., (b) a diol having a side chain alkyl group and 10 or less carbon atoms as a chain extender, and (c) an excessive amount of an organic diisocyanate. By the function of the side chain alkyl group of the component (b), the time from the solidification of the adhesive by cooling to crystallization of the whole adhesive, that is, the time in which the tack disappears, can be extended.

Such a hot melt adhesive can form a heat activation type adhesive layer, but cannot be used as a pressure sensitive adhesive.

When a pressure sensitive adhesive has a storage modulus of $10^5$ to $10^7$ dyne/cm$^2$ (10 to 1000 kPa) around room temperature, it is known that the adhesive has good adhesion properties such as a tackifying force or tack. But, no proposal has been made on the control of the storage modulus of the conventional polyurethane adhesive to use it as a pressure sensitive adhesive.

In view of the aforementioned problems of the noted adhesives, an object of this invention is to provide a retroreflective sheeting that can be bonded to an adherent by pressing without heat activation and that can prevent a decrease of adhesion force and reflection luminance with time when it is bonded to an adherent comprising a plasticized plastic.

Other Art

U.S. Pat. No. 4,377,988 discloses a reflective animal collar that employs transparent microspheres and a specularly reflective layer as retroreflective elements that are partially embedded in a binder layer. Underlying the binder layer is a barrier layer that sorbs plasticizers more slowly than the binder layer. An adhesive layer, preferably a heat-activatable adhesive (column 3, lines 31–56) underlies the barrier layer.

U.S. Pat. No. 5,450,235 discloses a flexible retroreflective sheeting that uses cube-corner elements on the optical elements and a plastic/air interface or metallic coating as a reflective layer. Because of its flexibility, the sheeting is capable of being adhered to a variety of irregular surfaces.

According to the present invention, there is provided a retroreflective sheeting comprising:

(a) a multitude of retroreflective elements that include a layer of optical elements and a reflective element(s) that is positioned functionally behind the optical elements;

(b) a layer for supporting the retroreflective elements; and (c) an adhesive layer that is positioned below the support member and that contains a polyurethane crosslinked by at least an isocyanate compound, wherein the polyurethane is polymerized from a component containing a polyol having at least one alkyl side chain in a molecule, and wherein the adhesive has (i) a storage modulus of about $2\times10^7$ to $8\times10^7$ dyne per square centimeter when measured in a tensile mode at a frequency of 35 Hz and 25° C., and (ii)

a softening point of about 80° C. to less than 200° C.

DETAILED DESCRIPTION OF PREFERRED EMBODIMENTS

Figure 1:
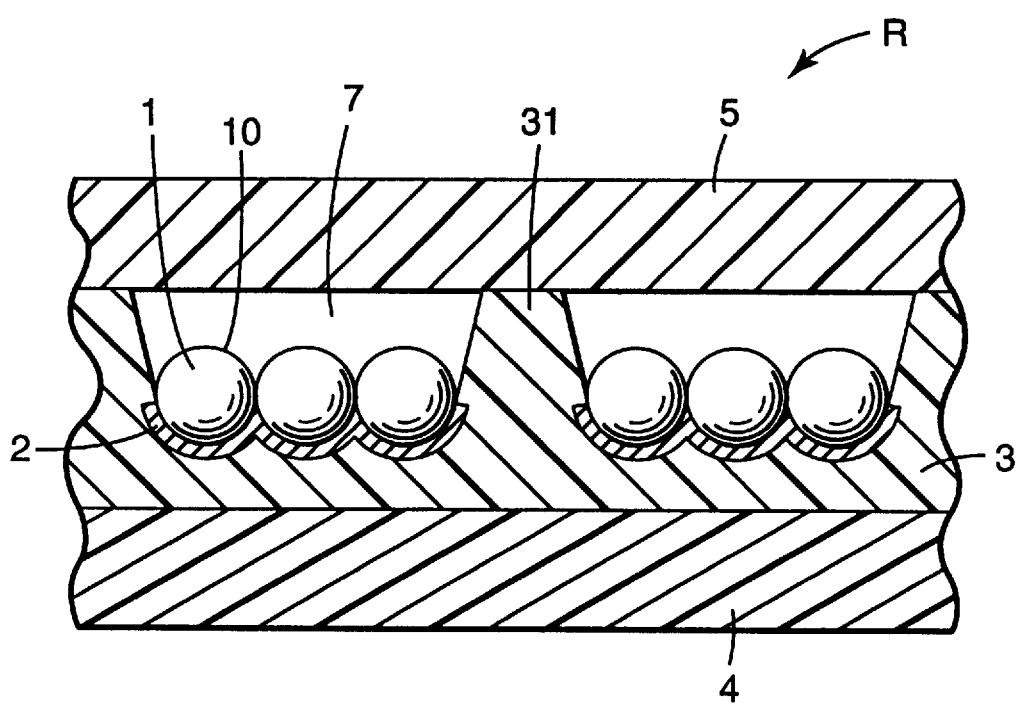

FIG. 1 schematically shows an example of the retroreflective sheeting in accordance with the present invention.

The retroreflective sheeting R shown in FIG. 1 is an encapsulated lens type retroreflective sheeting that comprises (a) a retroreflective element 10 comprising optical elements 1 that are positioned in a layer state and a reflective element(s) 2 that is positioned functionally behind the optical elements. The term "functionally behind" means the reflective element is located in an optical connection with the optical elements; that is, the reflective layer is capable of reflecting incident light back into the optical elements. When the sheeting is an encapsulated sheeting that uses lens elements (also known as beads or microspheres) as the optical elements, the reflective element(s) is preferably positioned at focal points of the lens elements 1. The sheeting also includes (b) a member 3 that is supports the optical elements and as shown is positioned below the reflective elements 2 and contains a binder, and (c) an adhesive layer 4 that is positioned beneath the support member 3. This sheeting also comprises a surface protective layer 5 over the retroreflective elements 10.

The protective layer 5 is supported by sealing walls 31 that include part of the binder and upper ends of which are adhered to the surface protective layer 5, whereby a sealed space 7 surrounded by the surface protective layer 5, the support member 3 and the retroreflective element 10 is formed.

Adhesive layer

The adhesive layer 4 contains a polyurethane that is crosslinked by use of at least an isocyanate compound.

The polyurethane is polymerized from a component containing a polyol having at least one alkyl side chain in a molecule. The adhesive layer 4 has a storage modulus in the range between $2\times10^7$ to $8\times10^7$ dyne/cm$^2$ when measured in a tensile mode at a frequency of 35 Hz and 25° C. Further, the adhesive layer has a softening point from 80° C. to less than 200° C.

The polyurethane polymerized from a component containing a polyol having at least one alkyl side chain in a molecule (hereinafter sometimes referred to as "side chain-containing polyurethane") functions to impart a pressure sensitive adhesion property to the adhesive layer without losing the tack of the adhesive layer at room temperature (about 25° C.) substantially permanently. That is, when the adhesive containing such polyurethane is used as the adhesive after being crosslinked by the isocyanate compound in the presence of moisture, the tack at room temperature is not lost by the progress of crosslinking. This may be because the crystallization of the polyol portions, which are crystallized at room temperature, is prevented, and the tack at room temperature of the whole polyurethane is not lost.

The side chain-containing polyurethane, which is crosslinked by the isocyanate compound (which will be explained in detail below), functions to prevent a decrease of the adhesion force and the reflection luminance with time caused by a plasticizer, when the retroreflective sheeting is bonded to an adherent containing plasticized plastic.

When the storage modulus of the adhesive layer is about $2\times10^7$ to $8\times10^7$ dyne/cm$^2$, the tack at room temperature is in a suitable range, so that the bonding workability of the retroreflective sheeting is improved, and also the plasticizer resistance is improved. When the storage modulus is less than about $2\times10^7$ dyne/cm$^2$, plasticizer resistance deteriorates, while when it exceeds about $8\times10^7$ dyne/cm$^2$, the tack at room temperature tends to deteriorate and it is difficult to bond the retroreflective sheeting to the adherent without heating the adhesive layer. From such view point, preferably, the storage modulus is about $4\times10^7$ to $7\times10^7$ dyne per square centimeter.

To adjust the storage modulus in such a range, various measures can be employed, for example, controlling the storage modulus and the softening point of the uncrosslinked side chain-containing polyurethane in certain ranges, using the isocyanate compound in a certain content range, adding a tackifying agent, mixing a thermoplastic polymer having a low Tg, for example, lower than 10° C., and so on. Among them, (1) the control of the storage modulus and the softening point of the uncrosslinked side chain-containing polyurethane and (2) the use of the isocyanate compound in a certain content range are preferred to obtain the inherent plasticizer resistance of the polyurethane.

When the softening point of the adhesive is less than about 80° C., the adhesive layer tends to shrink as time passes. As the result, the retroreflective sheeting's dimensional stability tends to deteriorate. When the softening point of the adhesive is higher than 200° C., however, the tack at room temperature may decrease as the time passes, so that the bonding workability of the sheeting tends to worsen. From such view point, the softening point is preferably from about 100° to 190° C.

The term "tack" refers to so-called feel tack and means that an adhesive has a tackiness to a degree that bonding is easily carried out.

The term "softening point" means a temperature at which a film of the adhesive is broken when heated at a heating rate of 5°C./min. while applying a load of 2.5 g/100 μm (film thickness) vertically on the film. This measurement is carried out in a dry atmosphere such as in a dryer using a film that has been kept standing at a temperature of 23°±1° C., a humidity of 65±5% RH for 3 days after the molding of the film. The thickness of the film is adjusted to be between 50 and 300 micrometers (μm). The film sample is prepared by cutting the film in a JIS No. 2 dumbbell shape while aligning the flow direction of the polyurethane solution or melt in the film molding with the longitudinal direction of the dumbbell.

The "storage modulus" is measured using a viscoelastic measuring apparatus in the tensile mode at the frequency of 35 Hz, 25° C.

A specific example of the viscoelastic measuring apparatus is "RHEOVIBRON DDV 2-EP" manufactured by TOYO BOLDWN.

Side chain-containing polyurethane

The side chain-containing polyurethane is polymerized from the component containing the polyol having at least one alkyl side chain in a molecule. A preferred example of the "polyol having at least one alkyl side chain in a molecule" is one comprising an ester structure polymerized from a side chain-containing diol and a dicarboxylic acid, as a repeating unit. The side chain-containing polyurethane can be synthesized by a polymerization reaction between the polyol and the diisocyanate.

Specific examples of the side chain-containing diols are alkylene diols such as α-amylene glycol, 2,4-amylene glylcol, 1,2-propylene glycol, 1,3-butanediol, neopentyl glycol, 3-methyl-1,5-pentanediol, 2,2,4-trimethyl-1,3-pentanediol, 2-ethyl-1,3-hexanediol, 2,2-diethyl-1,3-propanediol, 2-n-butyl-2-ethylpropanediol, etc. They may be used independently or in admixture of two or more of them.

The number of the side chain alkyl groups of the polyol can be one or more, in general 8 or less, preferably from 1 to 4, per molecule.

Specific examples of the dicarboxylic acids are aliphatic dicarboxylic acids such as adipic acid, suberic acid, sebacic acid, etc. They too may be used independently or in admixture of two or more of them.

The above ester structure is easily formed by a dehydration reaction between the alkylene diol and the dicarboxylic acid, or a condensation reaction that liberates an alcohol between the alkylene diol and a dimethyl ester of the dicarboxylic acid.

In the synthesis of the polyol, a linear diol such as 1,4-butanediol, 1,6-hexanediol, etc. may be used in addition to the above alkylene diol and the dicarboxylic acid or its dimethyl ester to adjust the storage modulus and softening point of the final product.

Specific examples of the diisocyanates are diisocyanate monomers (e.g. tolylene diisocyanate, xylylene diisocyanate, 4,4'-diphenylmethane diisocyanate (hereinafter referred to as "MDI"), hexamethylene diisocyanate, isophorone diisocyanate, hydrogenated diphenylmethane diisocyanate, etc.), their oligomers, and reaction products of these monomers and di- or polyhydric polyol compounds. These may also be used independently or in admixture of two or more of them.

In synthesizing the side chain-containing polyurethane, in addition to the polyol and the diisocyanate, a short chain diol such as 1,4-butanediol, 1,6-hexanediol, diethylene glycol, and so on is used as a chain extender. The short chain diol may include the above side chain-containing diol.

The side chain-containing polyurethane can be synthesized by bulk polymerization, solution polymerization, and the like. The molecular weight of the side chain-containing polyurethane may be in a range in which the adhesive obtained by crosslinking the polyurethane has the desired properties. Usually, the weight average molecular weight is from 2,000 to 200,000.

Contents of the above components are determined so that the storage modulus and softening point of the adhesive are in the above ranges. To this end, preferably, the contents of the components are determined so that the uncrosslinked side chain-containing polyurethane has a storage modulus of about $1 \times 10^6$ to $5 \times 10^7$ dyne/cm$^2$, and a softening point of about 0° to 50° C. When the storage modulus of the side chain-containing polyurethane is smaller than about $1 \times 10^6$ dyne/cm$^2$, the plasticizer resistance of the crosslinked adhesive tends to deteriorate, while when it exceeds approximately $5 \times 10^7$ dyne/cm$^2$, the tack of the crosslinked adhesive at room temperature may not be sufficient. From such a view point, the storage modulus of the side chain-containing polyurethane is preferably from about $1 \times 10^7$ to $3 \times 10^7$ dyne/cm$^2$.

When the softening point of the side chain-containing polyurethane is lower than about 0° C., an additional amount of the isocyanate compound should be added to increase the softening point of the adhesive layer to 80° C. or higher, and then the tack of the adhesive layer may be decreased. When, the softening point is higher than about 50° C., the tack of the crosslinked adhesive tends to be insufficient.

In a preferred embodiment of the side chain-containing polyurethane, the polyol contains, as a repeating unit, an ester structure that is derived from adipic acid and a glycol having an alkyl side chain, namely a side chain-containing diol. When such a polyol is incorporated in a backbone of the polyurethane molecule, its crystallization is effectively prevented, so that the adhesive layer comprising the crosslinked polyurethane has suitable tack at room temperature, and then the bonding workability improves.

An example of such side chain-containing polyurethane is a polyurethane resin "MFS-58" (trade name) available from Nippon Polyurethane Co., Ltd.

Isocyanate compound

The "isocyanate compound" that functions to crosslink the side chain-containing polyurethane is a compound having at least two isocyanate groups in a molecule, and includes a polymer of a diisocyanate such as MDI, a reaction product of a diisocyanate and a di- or polyhydric polyol, and so on.

Specific examples of such isocyanate compounds are "COLONATE L", "COLONATE HL" and "COLONATE 2030", all available from Nippon Polyurethane Co., Ltd.

The content of the isocyanate compound is usually 20 wt. parts or less, for example, 1 to 10 wt. parts, preferably from 2 to 8.5 wt. parts per 100 wt. parts of the side chain-containing polyurethane. When the content of the isocyanate compound is too small, the plasticizer resistance tends to decrease, while when it is too large, the tack at room temperature tends to decrease.

Retroreflective layer

The retroreflective element(s) 10 comprises the layer of the optical lens elements 1 and the reflective elements 2 that are positioned in this embodiment at the focal points of the lens elements.

Examples of the retroreflective sheeting having such structure are an encapsulated lens reflective sheet that is explained in detail below, an enclosed lens reflective sheet, and an exposed lens reflective sheet (which has no surface protective layer).

Among them, the encapsulated lens reflective sheet is preferred since it has a relatively high reflection luminance and a relatively good property to maintain the high reflection luminance.

Encapsulated lens retroreflective sheeting

An encapsulated lens reflective sheet has the surface protective layer 5, that is explained in detail below, over the retroreflective element 10. The surface protective layer 5 is supported by the sealing walls 31 which include a part of the binder and the upper ends of which are adhered to the lower surface of the surface protective layer 5. Adjacent to the sealing walls 31, a specific gap is maintained between the surface protective layer 5 and the lens elements 1. The closed space 7 is formed by the surface protective layer 5, the support member 3 and the retroreflective element 10.

The encapsulated lens reflective sheet has a reflective layer which directly contacts the transparent microspheres as the lens elements. When the adhesive layer and the support member are swelled by the plasticizer, the distance between the reflective layer and the transparent microsphere is hardly changed, so that the reflection luminance has good stability as time passes.

The structure and production method of the encapsulated lens reflective sheet are disclosed in, for example, U.S. Pat. Nos. 4,025,159, 4,653,854, 5,066,098 and 5,069,964; JP-A-2-93684, and JP-A-2-93685.

A space 7 is formed between the surface protective layer and the lens elements, and separates them at a predetermined distance. Thereby, the desired high reflection luminance is achieved.

Surface protective layer

As a surface protective layer 5, there is used a single-layer or multi-layer film of a transparent plastic such as a polyester resin, a polyolefin resin (including a copolymer such as an ethylene-acrylic acid copolymer), an acrylic resin, a polyurethane resin, a polyvinyl chloride resin, a fluororesin, an ionomer resin, etc.

The thickness of the surface protective layer 5 is preferably from about 10 to 200 µm, more preferably from about 30 to 100 µm. The surface protective layer may contain an additive such as an antioxidant, a UV light absorber, a colorant, and so on.

In the case of the encapsulated lens reflective sheet, a surface of the surface protective layer 5 which is adhered to the sealing walls 31 consisting of the part of the binder may be subjected to a treatment for making adhesion easy such as corona treatment, primer coating, and so on.

Lens elements

The lens elements typically comprise transparent microspheres that are positioned substantially in a single layer. As the transparent microspheres, glass beads having a desired refractive index are used. A refractive index is usually from about 1.4 to 2.7.

In the case of the encapsulated lens retroreflective sheeting, the refractive index is preferably from about 1.6 to 2.3. When the refractive index is outside this range, retroreflectivity may be lost. That is, the amount of light which is retroreflected in the direction of the incident light is decreased, while the angle of observation of the reflected light is widened. Widening of the angle of observation to some extent may be used in a retroreflective sheeting of a wide angle of observation type, which widens the angle of observation while maintaining the reflection luminance in an acceptable range. However, if the angle of observation is too large, the reflection luminance is decreased to a practically unpreferred level. Then, the more preferred refractive index is in the range between about 1.9 and 2.1.

The diameter of the microsphere is usually from about 10 to 860 µm, preferably from about 20 to 150 µm, more preferably from about 25 to 80 µm. When the diameter is too small, it is difficult to produce microspheres having a uniform diameter and a uniform refractive index, and the reflection luminance of the reflective sheet comprising such microspheres tends to decrease and retroreflectivity tends to deteriorate. When this diameter is too large, the thickness of the reflective sheet may increase, and the flexibility of the reflective sheet tends to decrease.

Two or more kinds of the transparent microspheres having different refractive indexes may be used in combination, or two or more types of transparent microspheres having different diameters may be used in combination.

When the transparent microspheres are colored by a colorant which maintains the light transparency, the reflected light has a different color from that of the incident light.

Reflective elements

As the reflective element 2, a thin film having specular gloss, a reflective resin film containing a pearlescent pigment and the like can be used. The thin film may be formed by a thin film forming method such as vapor deposition from a metal such as aluminum, copper, silver, gold, zinc, etc. or a compound such as $CeO_2$, $Bi_2O_3$, ZnS, $TiO_2$, $CaF_2$, $Na_3AlF_6$, $SiO_2$, $MgF_2$, etc. The reflective resin film may be formed by coating a paint comprising a resin and a pearlescent pigment (e.g. $BiOCl_4$, $PbCO_3$, guanine obtained from fish scales, etc.) on the lens elements.

The reflective element is formed in contact with the lower half surface of each transparent microsphere in the case of the encapsulated lens retroreflective layer.

The thickness of the reflector is usually from about 0.01 to 10 µm, preferably from about 0.05 to 5 µm.

The pearlescent pigment may be added to the support member to increase the reflection efficiency of the reflective layer.

Support member

The support member 3 typically comprises a binder and is positioned below the reflective element 2.

In the case of the encapsulated lens reflective sheet, the support member 3 supports and fixes the lens elements 1, the lower half surfaces of which are coated by the reflective elements.

The thickness of the support member 3 is usually from about 50 to 150 µm.

The support member comprises a resin such as a polyurethane resin, an acrylic resin, a polyester resin, and so on. The resin may be (i) a thermoplastic resin or (ii) a curable resin such as a thermosetting resin, a radiation-curable resin, etc. The curable resin is preferred. The curable resin can improve the solvent resistance of the support member. In the case of the encapsulated lens reflective sheet, the adhesion force between the sealing walls 31 and the surface protective layer 5 can be increased.

The softening point of the resin (a softening point before curing in the case of the curable resin) is usually from about 70° to 180° C., preferably from about 80° to 160° C.

Among the above resins, the polyurethane resin is preferred. The polyurethane resin can be heat cured using the isocyanate compound, easily forms the space 7 which encloses the lens elements 1 of the encapsulated lens reflective sheet, and prevents deformation of the space 7 by an external force after being shaped and heat cured.

In general, such polyurethane resin has a weight average molecular weight of about 70,000 to 150,000.

As the polyurethane resin, an aromatic or aliphatic polyurethane resin can be used. In view of the easy improvement of weather resistance, the aliphatic polyurethane is preferred.

The support member may contain, in addition to the above resin, additives such as a pigment (e.g. rutile titanium dioxide, etc.), a polymerization initiator, a crosslinking agent, an antioxidant, a UV light absorber, a fungicide, an antistatic agent, a higher fatty acid, and so on.

Production steps of reflective sheet

A method for producing the reflective sheet of the present invention is explained by making reference to the encapsulated lens reflective sheet as an example.

(1) On a carrier web having a polyethylene coating layer, plural transparent microspheres as the lens means are partly embedded detachably in the polyethylene coating layer to form a layer of the transparent microspheres.

(2) On a surface of the exposed part of each microsphere, a reflective element is formed by a thin film-forming method such as vapor deposition.

(3) On the reflective elements, the support member and a releasing film are laminated in that order.

(4) After the step (3), the carrier web is removed to expose a surface of each microsphere which is not covered by the reflective element.

(5) Over the surfaces of the microspheres which are not covered by the reflective elements, the surface protective layer is placed while leaving a predetermined gap between the microsphere layer and the surface protective layer.

(6) Then, on the releasing film, an embossing roll having a net-form emboss pattern of thin lines is pressed with heating to emboss the support member layer through the releasing film, whereby the sealing walls which bond the surface protective layer partly to the support member are formed, and also the space is formed to encapsulate the transparent microspheres.

(7) The releasing film is removed to expose the other major surface of the support member.

(8) On the exposed major surface, an adhesive layer is laminated.

In the above step (8), the adhesive layer may be formed by coating a coating liquid comprising the side chain-containing polyurethane, the crosslinking agent, and a solvent by coating means and drying it. As the coating means, a coater such as a bar coater, a knife coater, a roll coater, a die coater and so on can be used. The thickness of the adhesive layer is usually from about 50 to 1000 μm.

As the releasing film used in the above step (3), a flexible film such as a polyethylene terephthalate film is used, and in the step (7), this film is not removed, and the adhesive layer is formed on this film, whereby the flexible film is included in the layers as a reinforcing film.

Article having retroreflectiveness

The article having retroreflectivity according to the present invention comprises an article body and the reflective sheet which is bonded to the article body. Since the reflective sheet has the above described structure, the reflective sheet is bonded to the article body at a high adhesive force for a long time, and therefore it is not peeled off, and high reflection luminance is maintained for a long time.

In the case of the an article having retroreflectivity according to the present invention, when the article body comprises a plasticized plastic or a plasticized polyvinyl chloride resin, the article retains high adhesion force and high reflection luminance for a longer time than the conventional encapsulated lens reflective sheet which has an acrylic pressure sensitive adhesive layer.

The polyvinyl chloride resin includes a homopolymer of vinyl chloride, and a copolymer of vinyl chloride. Examples of such copolymers are those comprising vinyl chloride and one or more of copolymerizable monomers such as vinyl acetate, vinyl alcohol, vinyl acetal, maleic acid, a styrene monomer, etc.

Examples of the plasticizer to be contained in the polyvinyl chloride are the conventional phthalate type, polyester type, adipate type, aliphatic acid type, trimellitate type, epoxy type plasticizers. The amount of the plasticizer is in general from 1 to 50 wt. % based on the whole resin weight.

In a preferred embodiment of the article having retroreflectivity according to the present invention, when the article body comprises the above described plasticized plastic, the peel adhesion force between the reflective sheet and the article body can be maintained at a high value of 3 kg/inch (=ca. 25.4 mm) or larger for a long time, while maintaining good bonding workability of the sheet to the article body.

EXAMPLES

Example 1

(1) In a carrier sheet, glass beads having an average diameter of 65 μm were embedded to a depth of about 30% of the diameter, and exposed surfaces of the beads were vapor deposited with aluminum.

Over the glass beads, a resin solution of the following components was coated:

|  | wt. parts |
|---|---|
| TAKELACK (polyurethane resin manufactured by Takeda Bardish Urethane) | 24.67 |
| TAIPAKE (titanium oxide manufactured by Ishihara Industries) | 7.00 |
| IRGANOX 1010 (antioxidant manufactured by Ciba-Geigy) | 0.48 |
| Stearic acid | 0.48 |
| Methyl ethyl ketone | 49.49 |
| Cyclohexanone | 17.88 |

The coated solution was dried at about 100° C. to form a binder layer having a thickness of about 50 μm. On this binder layer, a polyethylene film having a thickness of about 25 μm which had been release treated was laminated at about 100° C. under pressure of 3 kg/cm².

Thereafter, the carrier sheet was peeled off, and then an extrusion molded film of EAA (ethylene-acrylic acid copolymer) containing a UV light absorber and having a thickness of about 75 μm (Primacor 3440 manufactured by Dow Chemical) was placed over the exposed glass beads.

Next, this composite was pressed between an embossing roll and a rubber roll heated at 160° C. and 80° C., respectively under pressure of 1 to 3 kg/cm² and embossed along lines of a net form pattern of the embossing roll. Thereafter, the polyester film was peeled off to expose the resin layer.

(2) On the surface of a silicone-treated releasing paper, a resin solution having the following composition was hand coated with a knife coater to a wet thickness of about 250 μm and dried at about 80° C. to form an adhesive layer, which was adhered to the binder layer surface of the intermediate produced in the above step (1) under pressure of about 3 kg/cm²:

| | wt. parts |
|---|---|
| MFS-58 (polyester base polyurethane manufactured by Nippon Polyurethane) | 100.00 |
| COLONATE L (isocyanate manufacture by Nippon Polyurethane) | 2.80 |

In this case, the softening point and the storage modulus (at 25° C.) of the adhesive were 110° C. and $4.5 \times 10^7$ dyne/cm$^2$, respectively.

By the above steps, an encapsulated lens retroreflective sheeting was obtained.

Example 2

In the same manner as in Example 1 except that the amount of COLONATE L was changed to 5.55 wt. parts in the step (2), an encapsulated lens retroreflective sheeting was produced. In this case, the softening point and the storage modulus (at 25° C.) of the adhesive were 181° C. and $5.8 \times 10^7$ dyne/cm$^2$, respectively.

Example 3

In the same manner as in Example 1 except that the amount of COLONATE L was changed to 8.32 wt. parts in the step (2), an encapsulated lens retroreflective sheeting was produced. In this case, the softening and the storage modulus (at 25° C.) of the adhesive were 185° C. and $6.6 \times 10^7$ dyne/cm$^2$, respectively.

Comparative Example 1

In the same manner as in Example 1 except that no COLONATE L was used in the step (2), an encapsulated lens retroreflective sheeting was produced. In this case, the softening point and the storage modulus (at 25° C.) of the adhesive were 33° C. and $2.2 \times 10^7$ dyne/cm$^2$, respectively.

Comparative Example 2

In the same manner as in Example 1 except that MFS-34 (polycarbonate base polyurethane manufactured by Nippon Polyurethane) was used as the adhesive in place of MFS-58 in the step (2), an encapsulated lens retroreflective sheeting was produced. In this case, the softening point and the storage modulus (at 25° C.) of the adhesive were 67° C. and $1.1 \times 10^8$ dyne/cm$^2$, respectively.

Comparative Example 3

In the same manner as in Example 1 except that MFS-49 (polycarbonate base polyurethane manufactured by Nippon Polyurethane) was used as the adhesive in place of MFS-58 in the step (2), an encapsulated lens retroreflective sheeting was produced. In this case, the softening point and the storage modulus (at 25° C.) of the adhesive were 65° C. and $8.3 \times 10^7$ dyne/cm$^2$, respectively.

Comparative Examples 4, 5 and 6

As Comparative Examples 4, 5 and 6, the following commercially available retroreflective sheetings were used:

Comparative Example 4:
580 of 3M (an enclosed lens reflective sheet having an acrylic pressure sensitive adhesive layer).

Comparative Example 5:
PV-500 of 3M (an enclosed lens reflective sheet having an acrylic pressure sensitive adhesive layer).

Comparative Example 6:
3840 of 3M (an encapsulated lens reflective sheet having an acrylic pressure sensitive adhesive layer).

In the above Examples and Comparative Examples, the storage modulus was measured using a "RHEOVIBRON DDV 2-EP" machine (manufactured by TOYO BOLDWIN) under the following conditions:

Frequency: 3.5 Hz

Heating rate: 2.0° C./min.

After peeling off the releasing paper from each of the encapsulated lens retroreflective sheetings produced in Examples 1,2 and 3 and Comparative Examples 1, 2 and 3, and the retroreflective sheetings of Comparative Examples 4, 5 and 6, each retroreflective sheeting was adhered to a soft polyvinyl chloride base material GSV-W70A for a traffic cone (manufactured by TOGU Safety Industries) (thickness of about 3.5 mm, and a dioctyl phthalate (plasticizer) content of about 30 wt. parts per 100 wt. parts of the vinyl chloride resin), and aged in an oven maintained at 65° C. for one week.

With each retroreflective sheeting, bonding workability and size stability were evaluated, and retention of luminance and 180 degree peeling strength were measured.

The bonding workability was evaluated as follows:

When the sheet was adhered, if the adhesive layer had sufficient tack at room temperature and adhered to an adherent without heating the adherent (as in the case of the acrylic pressure sensitive adhesive), such sheet was evaluated as excellent "O".

Since the retroreflective sheeting of Comparative Example 2 had no tack at room temperature, it was adhered to the adherent which was heated at about 70° C. Since such procedure required the heating time and process, the bonding workability was evaluated as bad "X".

Since the retroreflective sheeting of Comparative Example 3 had low tack at room temperature, it was adhered to the adherent in the same way as in the case of the sheet of Comparative Example 2. If when the adherent had no curved surface (unlike the traffic cone), the sheet could be adhered without heating the adherent, the bonding workability was evaluated as fair "D".

As the size stability, a degree of shrinkage of the retroreflective sheeting after the above aging was ranked as follows:

O: Substantially no shrinkage.

D: A degree of shrinkage being 1 mm or less.

X: A degree of shrinkage exceeding 1 mm.

The retention of luminance was a ratio (%) of the reflection luminance after the above aging to that before the aging, when the reflection luminance was measured using a reflectometer (Model 920 manufactured by Advanced Retro Technology).

The 180 degree peeling strength was measured for the retroreflective sheeting after the above aging according to JIS Z 0237 8.3.1 using a tensile tester "TENSILON" manufactured by TOYO BOLDWIN.

The results are shown in Table 1.

TABLE 1

| Retro-reflective sheet | Boding workability | Size stability | Retention of luminance (%) | 180 degree peel strength (kg/inch) |
|---|---|---|---|---|
| Ex. 1 | O | O | 93 | 3.5 (film break) |
| Ex. 2 | O | O | 95 | 3.0 (film break) |

TABLE 1-continued

| Retro- reflective sheet | Boding workability | Size stability | Retention of luminance (%) | 180 degree peel strength (kg/inch) |
|---|---|---|---|---|
| Ex. 3 | O | O | 95 | 3.3 (film break) |
| C. Ex. 1 | O | X | 90 | 3.3 (film break) |
| C. Ex. 2 | X | D | 94 | 3.5 (film break) |
| C. Ex. 3 | D | D | 91 | 3.1 (film break) |
| C. Ex. 4 | O | O | 40 | 0.7 |
| C. Ex. 5 | O | D | 52 | 1.6 |
| C. Ex. 6 | O | O | 95 | 0.6 |

As seen from the results of Table 1, the encapsulated lens retroreflective sheetings of the present invention have excellent plasticizer resistance, and the reflection luminance and the adhesion force (180 degree peeling strength) are not deteriorated with time when they are aged at 65° C. for one week after they are adhered to an adherent containing a large amount of the plasticizer. Further, the encapsulated lens retroreflective sheetings of the present invention have as good bonding workability as the retroreflective sheetings using the acrylic tackifiers (Comparative Examples 4, 5 and 6).

The present invention can provide an encapsulated lens retroreflective sheeting which is excellent in bonding workability on the adherent and plasticizer resistance.

I claim:

1. A retroreflective sheeting that comprises:
   (a) a multitude of retroreflective elements that includes a layer of optical elements and a reflective element(s) that is positioned functionally behind the optical elements;
   (b) a support layer positioned below the retroreflective elements; and
   (c) an adhesive layer that is positioned below the support layer and that contains a polyurethane crosslinked by at least an isocyanate compound,
   wherein the polyurethane is polymerized from a component containing a polyol having at least one alkyl side chain in a molecule, and wherein
   the adhesive has (i) a storage modulus of about $2 \times 10^7$ to $8 \times 10^7$ dyne per square centimeter when measured in a tensile mode at a frequency of 35 Hz and 25° C., and (ii) a softening point of about 80° C. to less than 200° C.

2. The retroreflective sheeting of claim 1, wherein the polyurethane before being crosslinked has a storage modulus in the range between $1 \times 10^6$ to $2.5 \times 10^7$ dyne/cm$^2$ when measured under the same condition as above, and a softening point of 0° to 50° C.

3. The retroreflective sheeting of claim 2, wherein the polyol comprises a polyester structure formed from adipic acid and a glycol having the alkyl side chain in a molecule, as a repeating unit.

4. The retroreflective sheeting of claim 1, wherein the adhesive contains 1 to 10 parts by weight of the isocyanate compound per 100 parts by weight of the polyurethane.

5. The retroreflective sheeting of claim 1 being an encapsulated lens sheeting that comprises a surface protective layer that is connected to sealing walls that also join the support member, the surface protective layer being disposed over a retroreflective sheeting gap spaced from the optical elements to form an enclosed space.

6. An article that comprises an article body that includes a plasticized plastic surface onto which a retroreflective sheeting of claim 1 is bonded to by the adhesive layer.

* * * * *